US008736796B2

(12) United States Patent
Kajita

(10) Patent No.: US 8,736,796 B2
(45) Date of Patent: May 27, 2014

(54) LIQUID CRYSTAL PANEL AND LIQUID CRYSTAL DISPLAY DEVICE

(75) Inventor: Daisuke Kajita, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 93 days.

(21) Appl. No.: 13/402,491

(22) Filed: Feb. 22, 2012

(65) Prior Publication Data

US 2012/0218497 A1  Aug. 30, 2012

(30) Foreign Application Priority Data

Feb. 24, 2011  (JP) .................................. 2011-037928

(51) Int. Cl.
*G02F 1/1335* (2006.01)
(52) U.S. Cl.
USPC .......................................... 349/117; 349/114
(58) Field of Classification Search
CPC .................................. G02F 1/1335; G02F 1/13
USPC .................................................. 349/114, 117
See application file for complete search history.

(56) References Cited

U.S. PATENT DOCUMENTS

| 6,295,108 B1* | 9/2001 | Kaneko ......................... 349/115 |
| 2005/0068480 A1 | 3/2005 | Hiyama et al. |
| 2005/0206817 A1 | 9/2005 | Kajita et al. |
| 2006/0238679 A1* | 10/2006 | Hirai ............................. 349/117 |
| 2008/0018834 A1* | 1/2008 | Matsushima et al. ........... 349/98 |
| 2011/0007233 A1 | 1/2011 | Matsui et al. |
| 2011/0116023 A1 | 5/2011 | Kajita et al. |

FOREIGN PATENT DOCUMENTS

| JP | 2004-309922 | 11/2004 |
| JP | 2005-128498 | 5/2005 |
| JP | 2005-208356 | 8/2005 |
| JP | 2011-017834 | 1/2011 |

* cited by examiner

*Primary Examiner* — Lucy Chien
(74) *Attorney, Agent, or Firm* — Hamre, Schumann, Mueller & Larson, P.C.

(57) ABSTRACT

A first retardation plate arranged on a front side causes light received through the a first polarizing plate from the front side to become close to circularly polarized light rotating in a first direction. Second and third retardation plates arranged on a back side cause light received through a second polarizing plate from the back side to become close to circularly polarized light rotating in a second direction opposite to the first direction while passing through both of the second and third retardation plates and the liquid crystal layer in black display period. With this structure, good image quality can be obtained even when used in outdoor.

12 Claims, 11 Drawing Sheets

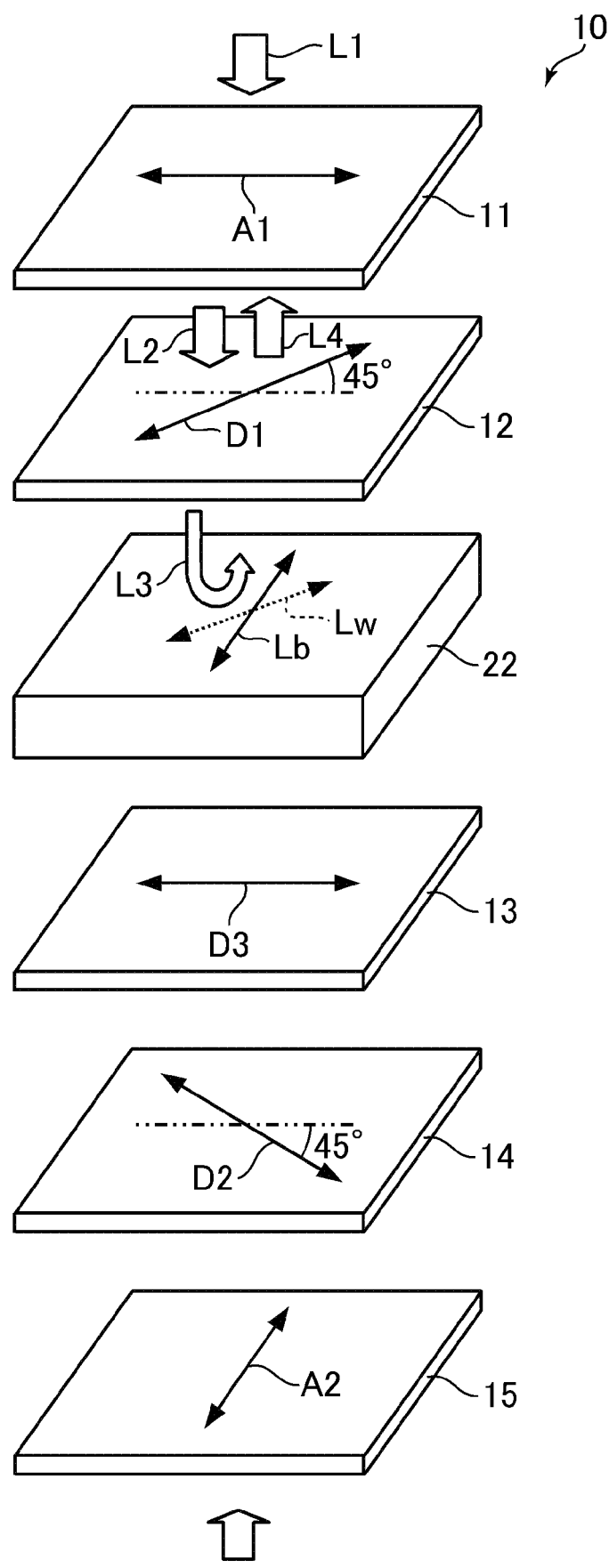

FIG.4A
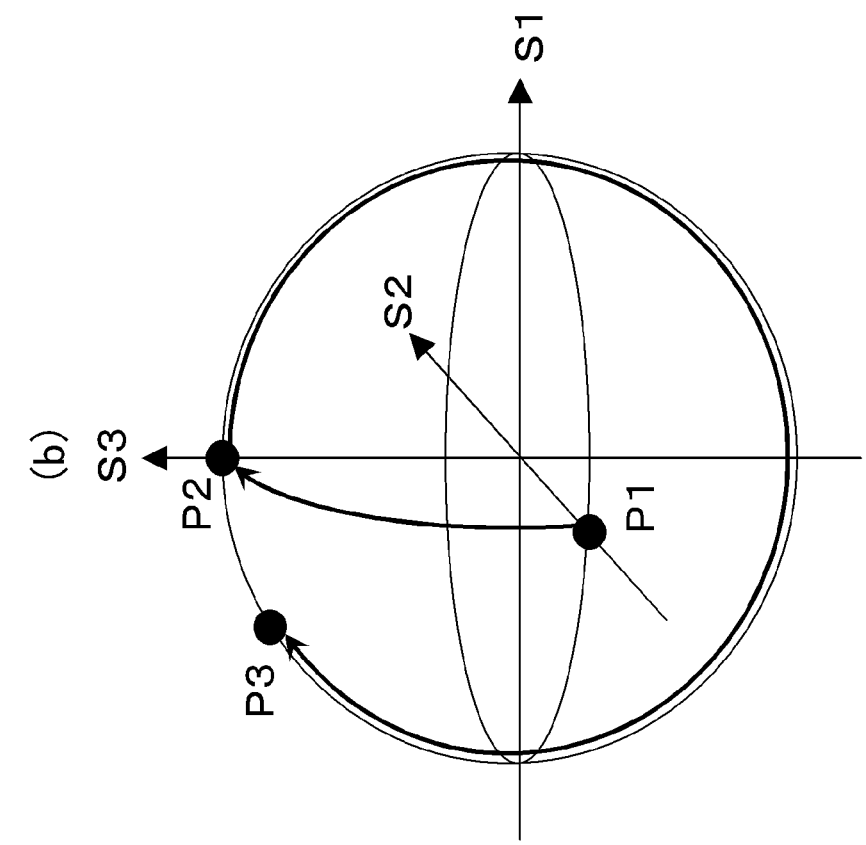
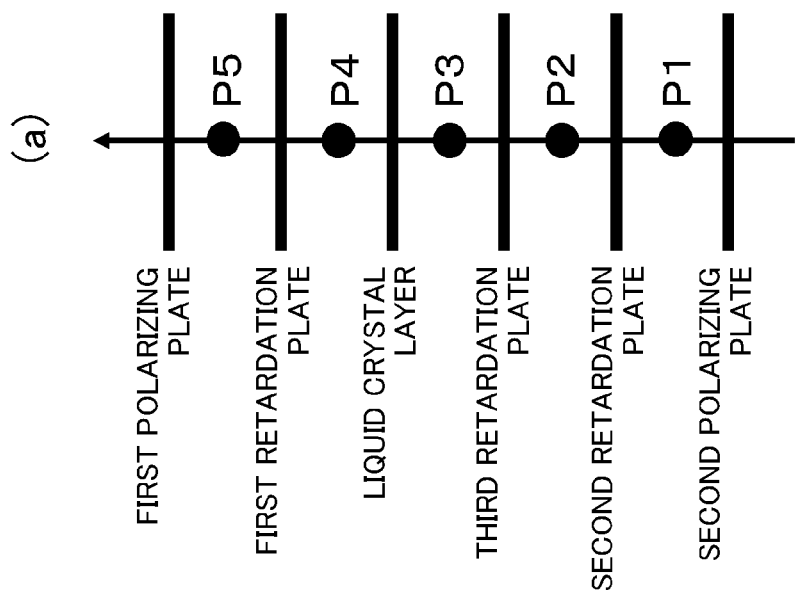

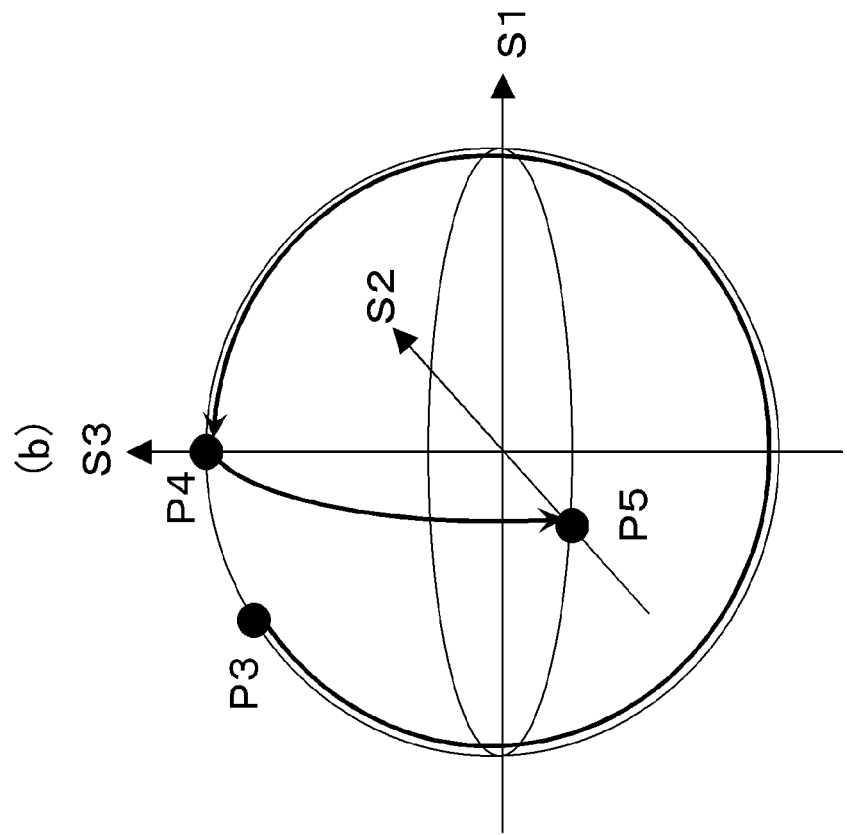
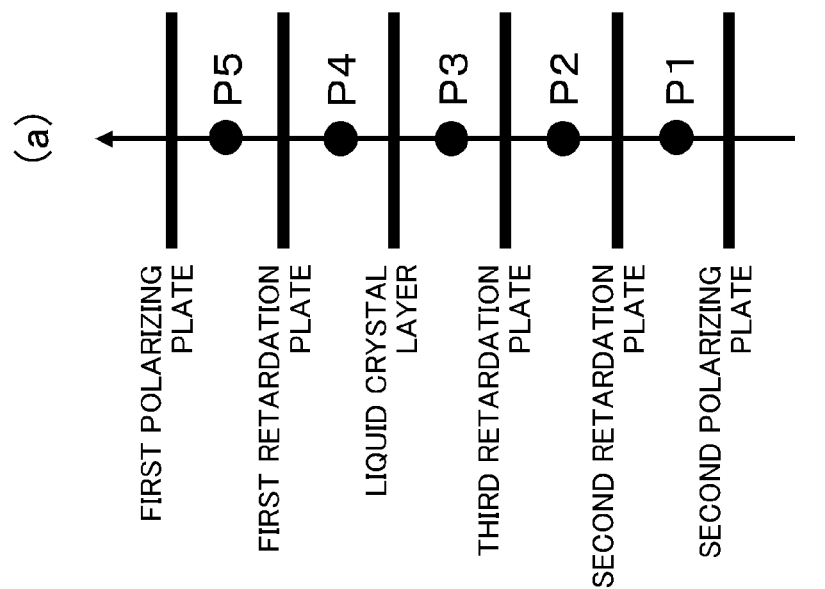
FIG.4B

FIG.8B
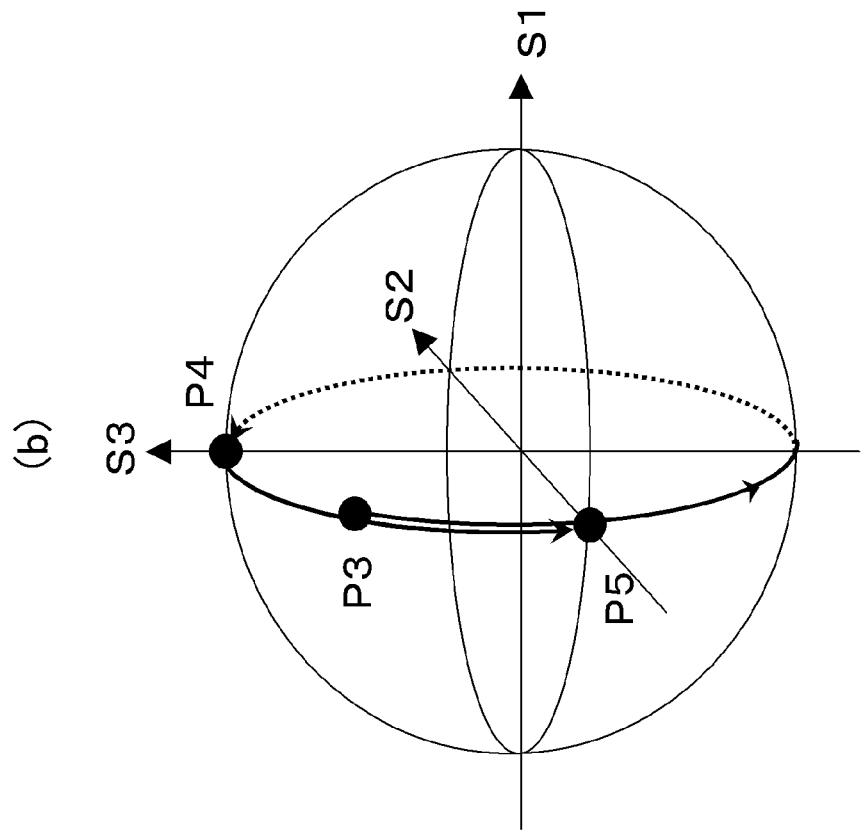
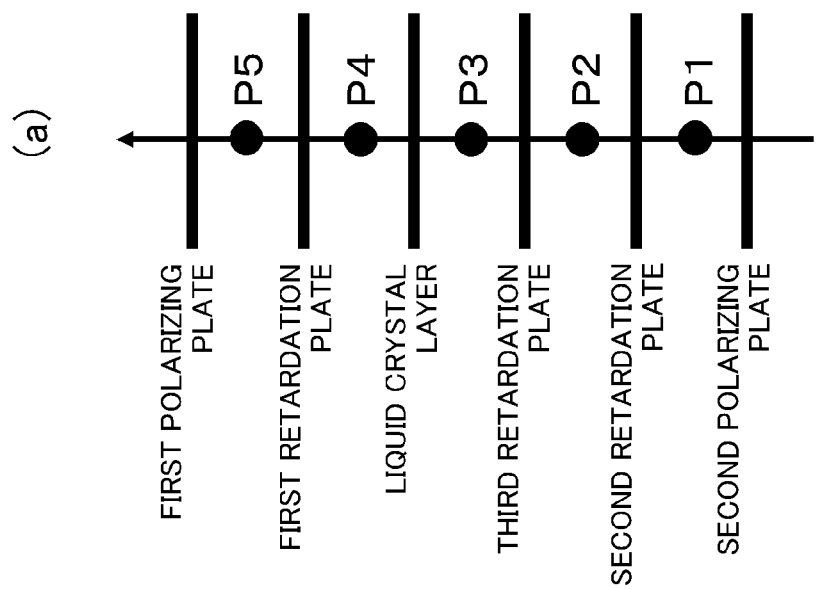

LIQUID CRYSTAL PANEL AND LIQUID CRYSTAL DISPLAY DEVICE

CROSS-REFERENCE TO RELATED APPLICATION

The present application claims priority from Japanese application JP 2011-037928 filed on Feb. 24, 2011, the content of which is hereby incorporated by reference into this application.

BACKGROUND OF THE INVENTION

1. Field of the Invention

The present invention relates to a liquid crystal panel of in-plane switching (IPS) mode which received light from a backlight unit, and more particularly, to a technology for reducing the outside light influence on image quality.

2. Description of the Related Art

There has been used a liquid crystal panel of in-plane switching (IPS) mode in which a pixel electrode and a common electrode are both formed on at least one substrate of two transparent substrates sandwiching a liquid crystal layer (for example, Japanese Patent Application Laid-open No. 2011-017834). The image quality of the liquid crystal panel of this mode is less dependent on the viewing direction of the liquid crystal panel, and hence, in recent years, demands for the liquid crystal panel of this mode have expanded.

SUMMARY OF THE INVENTION

Along with the recent widespread use of mobile phones and digital signage, many liquid crystal display devices are now used outdoors. In a case where the liquid crystal display device is used outdoors, not only light emitted through the liquid crystal panel from the backlight unit, but also outside light reflected on the liquid crystal panel reaches the observer's eye, and hence the image quality is liable to deteriorate. In other words, in order to improve the image quality under the environment with strong outside light, it is important to reduce the outside light reflectance on the liquid crystal panel. Further, in order to improve the image quality under the indoor environment with weak outside light, it is effective to reduce the light transmittance of the liquid crystal panel in black display period. That is, if it is possible to bring the transmittance in black display period close to 0, the contrast ratio of white display against black display increases, and good image quality can be obtained.

It is an object of the present invention to provide an IPS mode liquid crystal panel and a liquid crystal display device, which are capable of suppressing outside light reflection and also reducing light transmittance in black display period, to thereby obtain good image quality even when used both indoors and outdoors.

A liquid crystal panel according to the present invention uses light emitted from a backlight unit to a back side of the liquid crystal panel. The liquid crystal panel includes: a first polarizing plate arranged on a front side of the liquid crystal panel; a second polarizing plate arranged on the back side of the liquid crystal panel; and a liquid crystal cell having a liquid crystal layer containing liquid crystal molecules to be driven in in-plane switching mode, the liquid crystal cell being arranged between the first polarizing plate and the second polarizing plate. Further, the liquid crystal panel includes a first retardation plate arranged between the liquid crystal layer and the first polarizing plate. The first retardation plate causes retardation in light received through the first polarizing plate from the front side of the liquid crystal panel so that the received light becomes close to circularly polarized light rotating in a first direction from linearly polarized light. The liquid crystal panel further includes at least one retardation plate arranged between the liquid crystal layer and the second polarizing plate. The liquid crystal layer has different retardation values between in black display period and in white display period. The at least one retardation plate has a retardation value and a slow axis direction so that light received through the second polarizing plate from the back side of the liquid crystal panel becomes close to circularly polarized light rotating in a second direction opposite to the first direction from linearly polarized light while passing through both of the at least one retardation plate and the liquid crystal layer in black display period. A liquid crystal display device according to the present invention includes the above-mentioned liquid crystal panel.

According to the present invention, the outside light reflected on the liquid crystal cell passes through the first retardation plate twice, to thereby become close to linearly polarized light oscillating in the absorption axis direction of the first polarizing plate. Therefore, it is possible to suppress emission of the outside light, which is reflected on the liquid crystal cell, from the surface of the liquid crystal panel. Further, in black display period, the light received from the back side of the liquid crystal panel (light emitted from the backlight unit) passes through both of the at least one retardation plate and the liquid crystal layer, to thereby become close to the circularly polarized light rotating in the second direction. Therefore, this light passes through the first retardation plate to become close to the linearly polarized light oscillating in the absorption axis direction of the first polarizing plate. As a result, the light transmittance in black display period reduces, and thus good black display can be obtained. Further, the retardation value of the liquid crystal layer in white display period is different from the retardation value of the liquid crystal layer in black display period. Therefore, in white display period, the light received from the backlight unit does not become the circularly polarized light while passing through the at least one retardation plate and the liquid crystal layer, and is not absorbed in the first polarizing plate. As a result, white display becomes possible.

According to an aspect of the present invention, the at least one retardation plate may include: a second retardation plate, which has a retardation value and a slow axis direction corresponding to a retardation value and a slow axis direction of the first retardation plate; and a third retardation plate, which is arranged between the liquid crystal layer and the second retardation plate and has a retardation value and a slow axis direction corresponding to the retardation value and a slow axis direction of the liquid crystal layer set in black display period. According to this aspect of the present invention, the light received through the second polarizing plate from the back side of the liquid crystal panel can certainly become close to the circularly polarized light rotating in the second direction opposite to the first direction when passing through the liquid crystal layer.

According to this aspect of the present invention, the retardation value and the slow axis direction of the second retardation plate may be set so that a retardation caused by the first retardation plate is compensated; and the retardation value and the slow axis direction of the third retardation plate may be set so that the retardation caused by the liquid crystal layer in black display period is compensated. With this structure, the retardation value and the slow axis direction of the second retardation plate and the retardation value and the slow axis direction of the third retardation plate can be determined easily.

Further, according to this aspect of the present invention, the first retardation plate may employ a quarter wavelength plate having a slow axis direction which is tilted by substantially 45 degrees with respect to an absorption axis direction of the first polarizing plate; and the second retardation plate may employ a quarter wavelength plate having a slow axis direction substantially perpendicular to the slow axis direction of the first retardation plate. According to this aspect of the present invention, the outside light to be reflected on the liquid crystal cell passes through the first retardation plate twice, to thereby become the linearly polarized light oscillating in a direction along the absorption axis of the first polarizing plate. Further, the second retardation plate is also the quarter wavelength plate, and hence good black display can be easily obtained.

Further, according to this aspect of the present invention, the third retardation plate maybe substantially equivalent to the retardation value of the liquid crystal layer set in black display period, and the slow axis direction of the third retardation plate may be substantially perpendicular to the slow axis direction of the liquid crystal layer set in black display period. According to this aspect of the present invention, good white display can be easily obtained.

Further, according to this aspect of the present invention, the first retardation plate may employ a quarter wavelength plate having a slow axis direction tilted by substantially 45 degrees with respect to an absorption axis direction of the first polarizing plate. According to this aspect of the present invention, the outside light reflected on the liquid crystal cell passes through the first retardation plate twice, to thereby become the linearly polarized light oscillating in a direction along the absorption axis of the first polarizing plate.

According to another aspect of the present invention, the retardation value of the liquid crystal layer in black display period maybe larger than the retardation value of the liquid crystal layer in white display period; and a difference between the retardation value of the liquid crystal layer in black display period and the retardation value of the liquid crystal layer in white display period is equal to or larger than 100 nm and equal to or smaller than 300 nm. According to this aspect of the present invention, sufficient white display can be obtained.

According to still another aspect of the present invention, the retardation value of the liquid crystal layer in black display period may be larger than the retardation value of the liquid crystal layer in white display period and a difference between the retardation value of the liquid crystal layer in black display period and the retardation value of the liquid crystal layer in white display period is equal to or larger than a quarter wavelength and equal to or smaller than a half wavelength. According to this aspect of the present invention, sufficient white display can be obtained.

BRIEF DESCRIPTION OF THE DRAWINGS

In the accompanying drawings:

FIG. 2 is a view illustrating a slow axis direction and an absorption axis direction of optical members forming a liquid crystal panel of the liquid crystal display device;

FIG. 4A is a diagram illustrating an example of a polarization state variation in black display period;

FIG. 4B is a diagram illustrating an example of the variation of polarization state in black display period;

FIG. 8B is a diagram illustrating the example of the variation of polarization state in the case where the liquid crystal panel in the example illustrated in FIG. 7 displays black.

DETAILED DESCRIPTION OF THE INVENTION

Figure 1:
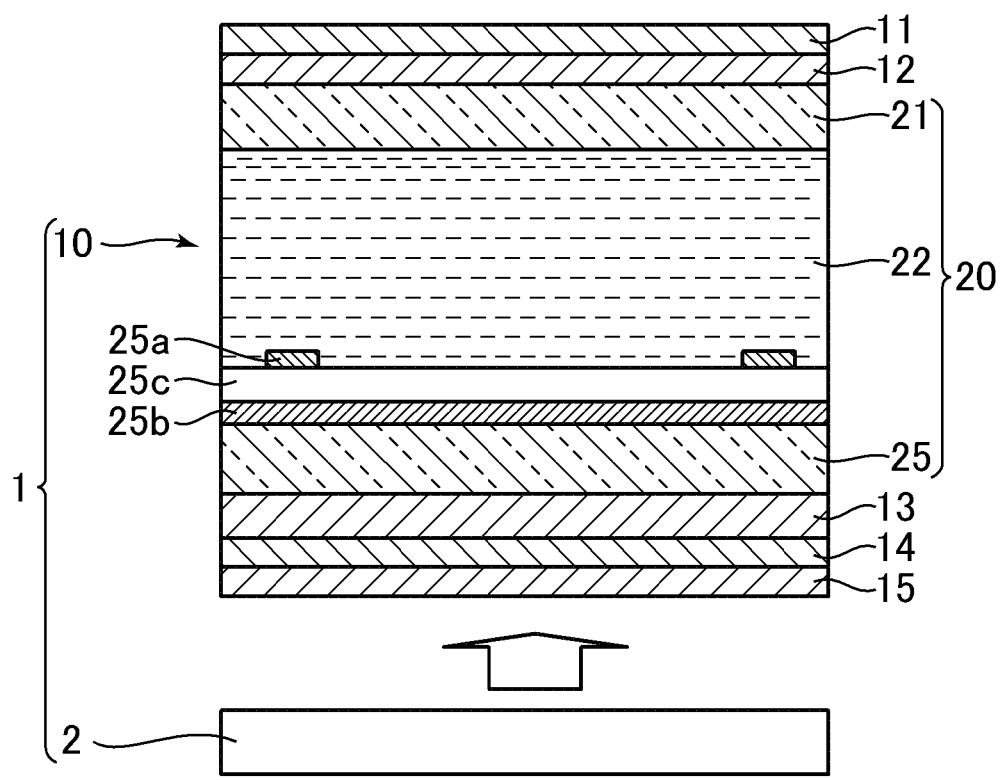
FIG. 1 is a sectional view schematically illustrating a structure of a liquid crystal display device according to an embodiment of the present invention.

Hereinafter, an embodiment of the present invention is described with reference to the drawings. FIG. 1 is a sectional view schematically illustrating a structure of a liquid crystal display device 1 according to an embodiment of the present invention. FIG. 2 is a view illustrating a slow axis direction and an absorption axis direction of optical members forming a liquid crystal panel 10 of the liquid crystal display device 1.

As illustrated in FIG. 1, the liquid crystal display device 1 includes the liquid crystal panel 10 of in-plane switching (IPS) mode and a backlight unit 2 arranged on the back side of the liquid crystal panel 10. The liquid crystal panel 10 receives light applied on the back side thereof from the backlight unit 2.

The liquid crystal panel 10 includes a first polarizing plate 11 arranged on the front side thereof, and a second polarizing plate 15 arranged on the back side thereof. The first polarizing plate 11 and the second polarizing plate 15 are arranged in a crossed Nicols arrangement. That is, an absorption axis direction A2 of the second polarizing plate 15 is substantially perpendicular to an absorption axis direction A1 of the first polarizing plate 11 (see FIG. 2).

As illustrated in FIG. 1, the liquid crystal panel 10 includes a liquid crystal cell 20 arranged between the first polarizing plate 11 and the second polarizing plate 15. The liquid crystal cell 20 includes two transparent substrates 21 and 25 facing each other, and a liquid crystal layer 22 is sandwiched between the two transparent substrates 21 and 25. The liquid crystal layer 22 includes liquid crystal molecules to be driven in the IPS mode. The transparent substrate 21, which is arranged on the front side of the liquid crystal cell 20, has a color filter (not shown) formed thereon.

The transparent substrate 25, which is arranged on the back side of the liquid crystal cell 20, has a pixel electrode 25a and a common electrode 25b both formed thereon. The electrodes 25a and 25b are made of a transparent conductive material such as indium tin oxide (ITO). The pixel electrode 25a is provided in each of a plurality of pixels arranged in matrix on the transparent substrate 25. The pixel electrode 25a is applied with a voltage corresponding to a gray scale value of each pixel through a thin film transistor (not shown) provided in each pixel.

The pixel electrode 25a and the common electrode 25b face each other across an insulating film 25c. In the example of FIG. 1, the insulating film 25c is formed on the common electrode 25b, and the pixel electrode 25a is formed on the insulating film 25c. A plurality of slits are formed in the pixel electrode 25a, and when the pixel electrode 25a of each pixel is seen in plain view, the pixel electrode 25a has a comb shape. The pixel electrode 25a is covered with an alignment layer (not shown), which defines an initial orientation direction of the liquid crystal molecules included in the liquid crystal layer 22. In this regard, the arrangement and form of the pixel electrode 25a and the common electrode 25b are not limited thereto. For example, a plurality of slits may also be formed in the common electrode 25b. Further, the pixel electrode 25a may be formed on the transparent substrate 25, the insulating film 25c may be formed on the pixel electrode 25a, and the common electrode 25b may be formed on the insulating film 25c.

As described above, the liquid crystal layer 22 includes the liquid crystal molecules to be driven in the IPS mode. That is, the liquid crystal layer 22 includes the liquid crystal molecules which rotate in a plane parallel to the transparent substrates 21 and 25 by an electric field generated by the pixel electrode 25a. The rotation of the liquid crystal molecules results that a slow axis direction of the liquid crystal layer 22 rotates in the plane parallel to the transparent substrates 21 and 25, and thus the light transmission is controlled. The slow axis direction rotates between a direction Lb set in black display period (see FIG. 2) and a direction Lw set in white display period (see FIG. 2). In this regard, the slow axis direction and a retardation value set when the electric field is applied to the liquid crystal layer (generally, when white is displayed) are each not uniform in the liquid crystal layer. Therefore, in the following description, the slow axis directions Lb and Lw and the retardation value of the liquid crystal layer 22 are defined as follows. Linearly polarized light is applied on the liquid crystal layer 22, and a variation of polarization state caused in the linearly polarized light is observed. The effective slow axis direction and retardation value of the liquid crystal layer 22 are observed on an assumption that the molecules of the liquid crystal layer 22 uniformly change the orientations thereof in a plane. In the following description, directions and a retardation value observed by such a method are defined as the slow axis directions Lb and Lw and the retardation value of the liquid crystal layer 22. In order to increase the contrast ratio, the slow axis direction Lw set in white display period is tilted by substantially 45 degrees with respect to the slow axis direction Lb set in black display period.

In the example illustrated in FIG. 2, the slow axis direction Lb of the liquid crystal layer 22 in black display period is perpendicular to the absorption axis direction A1 of the first polarizing plate 11. The slow axis direction Lb set in black display period is not limited thereto, and may be changed. For example, the slow axis direction Lb set in black display period may be parallel to the absorption axis direction A1 of the first polarizing plate 11. Further, the slow axis direction Lb may be tilted by a pre-set angle (for example, substantially 45 degrees) with respect to the absorption axis direction of the first polarizing plate 11.

"Black display period" is defined as a time period in which a voltage applied to the pixel electrode 25a is set so that the light transmittance of the liquid crystal cell 20 becomes the minimum. "White display period" is defined as a time period in which the voltage applied to the pixel electrode 25a is set so that the light transmittance becomes the maximum. The liquid crystal panel 10 of this example is a normally black type panel. Therefore, "black display period" is defined as a time period when the voltage applied to the pixel electrode 25a is the minimum (for example, 0) and the liquid crystal molecules are arranged in the initial orientation defined by the alignment layer. "White display period" is defined as a time period when the voltage applied to the pixel electrode 25a is the maximum and the liquid crystal molecules are tilted by substantially 45 degrees from the initial orientation.

The liquid crystal layer 22 has different retardation values between in black display period and in white display period. Specifically, the liquid crystal layer 22 has a lower retardation value in white display period than that in black display period. The retardation value in white display period is, for example, substantially half wavelength, and the retardation value in black display period is larger than half wavelength. The retardation value in black display period is desired to be close to one wavelength from the reasons described later.

Figure 3A:
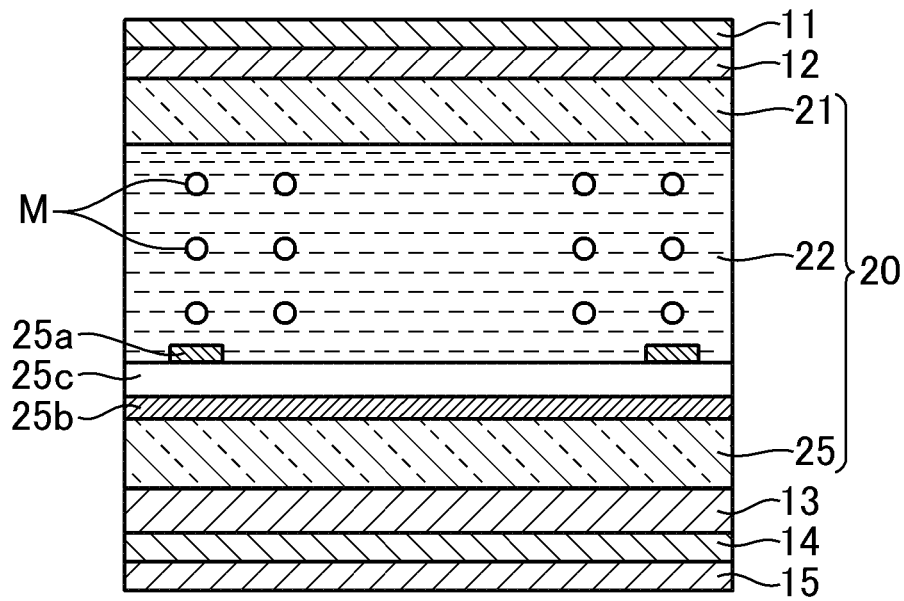
FIG. 3 is a view illustrating variation of a retardation value of a liquid crystal layer.
Figure 3B:
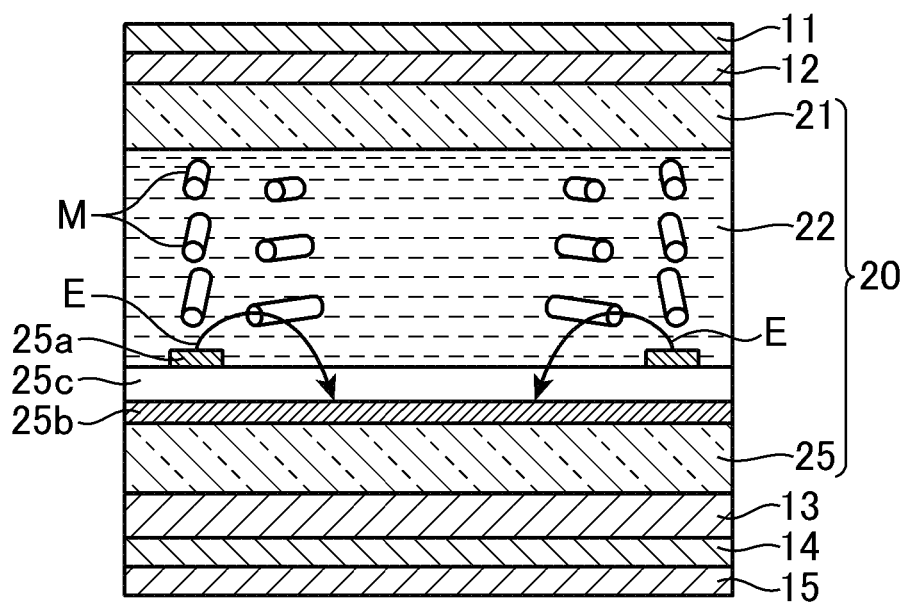

FIG. 3 is a view illustrating variation of the retardation value of the liquid crystal layer 22. FIG. 3(a) schematically illustrates orientation set in black display period of liquid crystal molecules M included in the liquid crystal layer 22, and FIG. 3(b) schematically illustrates orientation of the liquid crystal molecules M in white display period.

As described above, the liquid crystal panel 10 of this example is a normally black type panel. Therefore, as illustrated in FIG. 3(a), in black display period (that is, when the voltage of the pixel electrode 25a is the minimum), the liquid crystal molecules M are horizontally arranged, and the long axis direction of the liquid crystal molecules M is the initial orientation direction. In this example, the long axis direction of the liquid crystal molecules M is a direction perpendicular to the absorption axis direction A1 of the first polarizing plate 11. In white display period, a strong fringe electric field as exemplified by the solid line E in FIG. 3(b) is formed in the vicinity of the pixel electrode 25a. Therefore, the liquid crystal molecules M greatly rotate in the plane at an end portion of the pixel electrode 25a. As a result, because the liquid crystal molecules M have a property of a continuum, the liquid crystal molecules of the entire liquid crystal layer 22 rotates in a plane. On other hand, the liquid crystal molecules M immediately located above the pixel electrode 25a rise and tilt in the direction in which the two transparent substrates 21 and 25 face each other. Therefore, the retardation value set in white display period of the liquid crystal layer 22 becomes lower than that in black display period.

As illustrated in FIG. 1, the liquid crystal panel 10 includes a first retardation plate 12 between the liquid crystal cell 20 and the first polarizing plate 11. The first retardation plate 12 causes a retardation in light (linearly polarized light) received through the first polarizing plate 11 from the front side of the liquid crystal panel 10 so that the received light becomes close to circularly polarized light rotating from linearly polarized light. That is, a retardation value R1 and a slow axis direction D1 (see FIG. 2) of the first retardation plate 12 are set so that the linearly polarized light applied on the first retardation plate 12 through the first polarizing plate 11 becomes close to the circularly polarized light.

The first retardation plate 12 in this example is a quarter wavelength plate. As illustrated in FIG. 2, the slow axis direction D1 of the first retardation plate 12 is tilted by substantially 45 degrees with respect to the absorption axis direction A1 of the first polarizing plate 11. Therefore, the linearly polarized light applied on the first retardation plate 12 through the first polarizing plate 11 becomes the circularly polarized light while passing through the first retardation plate 12.

With the first retardation plate 12, reflection of the outside light by the liquid crystal panel 10 is suppressed. Referring to FIG. 2, outside light L1 passes through the first polarizing plate 11, to thereby become linearly polarized light L2 which oscillates in a direction perpendicular to the absorption axis direction A1 of the first polarizing plate 11. Then, the first retardation plate 12 transforms the linearly polarized light L2 into clockwise or counterclockwise circularly polarized light L3. When the circularly polarized light L3 is reflected on the transparent substrate 21 of the liquid crystal cell 20, the rotation direction thereof is reversed, and then the circularly polarized light L3 enters the first retardation plate 12 again. An increase of retardation is caused in the circularly polarized light L3 by its second penetration through the first retardation plate 12, and the circularly polarized light L3 is transformed into linearly polarized light L4. The oscillating direction of the linearly polarized light L4 is parallel to the absorption axis direction Al of the first polarizing plate 11. Therefore, the linearly polarized light L4 is absorbed in the first polarizing plate 11, and thus the reflection of the outside light by the liquid crystal panel 10 can be reduced.

As illustrated in FIGS. 1 and 2, the liquid crystal panel 10 includes a second retardation plate 14 and a third retardation plate 13 between the liquid crystal cell 20 and the second polarizing plate 15. Retardation values R2 and R3 and slow axis directions D2 and D3 (see FIG. 2) of the retardation plates 14 and 13, respectively, are set so that light received through the second polarizing plate 15 from the back side of the liquid crystal panel 10 becomes close to circularly polarized light (rotating in a direction reverse to that of the circularly polarized light which has passed through the first retardation plate 12 once from the front side of the liquid crystal panel 10) while passing through both of the retardation plates 14 and 13 and the liquid crystal layer 22 in black display period. Thus, in black display period, light emitted from the backlight unit 2 becomes close to linearly polarized light oscillating in parallel to the absorption axis direction A1 of the first polarizing plate 11 while passing through the retardation plates 14 and 13, the liquid crystal layer 22, and the first retardation plate 12, and hence is absorbed in the first polarizing plate 11. As a result, good black display can be obtained. Further, the retardation value of the liquid crystal layer 22 in white display period is, as described above, different from the retardation value of the liquid crystal layer 22 in black display period. Therefore, in white display period, light emitted from the backlight unit 2 and passing through the retardation plates 14 and 13 and the liquid crystal layer 22 does not become the circularly polarized light and hence is not absorbed in the first polarizing plate 11. As a result, white display becomes possible. In this regard, the retardation values R2 and R3 and the slow axis directions D2 and D3 of the retardation plates 14 and 13 are preferably set so that the light received through the second polarizing plate 15 from the back side of the liquid crystal panel 10 becomes circularly polarized light while passing through both of the retardation plates 14 and 13 and the liquid crystal layer 22 in black display period.

The retardation value R2 and the slow axis direction D2 of the second retardation plate 14 are set in accordance with the retardation value R1 and the slow axis direction D1 of the first retardation plate 12. In this example, the retardation value R2 and the slow axis direction D2 are set so that the retardation caused by the first retardation plate 12 can be compensated for. That is, the second retardation plate 14 is capable of, in black display period, compensating for (cancelling) the retardation caused to the light emitted from the backlight unit 2 by the first retardation plate 12. For example, the retardation value R2 of the second retardation plate 14 is set equal to the retardation value R1 of the first retardation plate 12, and the slow axis direction D2 is set substantially perpendicular to the slow axis direction D1 of the first retardation plate 12.

In this example, similarly to the first retardation plate 12, the second retardation plate 14 is a quarter wavelength plate. Further, the slow axis direction D2 of the second retardation plate 14 is, as illustrated in FIG. 2, substantially perpendicular to the slow axis direction D1 of the first retardation plate 12, and is tilted by substantially 45 degrees with respect to the absorption axis direction A2 of the second polarizing plate 15. Therefore, the linearly polarized light obtained by transmission through the second polarizing plate 15 passes through the second retardation plate 14 to become circularly polarized light. Alternatively, the retardation value R2 of the second retardation plate 14 may be set to be a difference between one wavelength ($\lambda$) and the retardation value R1 ($\lambda$-R1, for example, ¾ wavelength). In this case, the slow axis direction D2 of the second retardation plate 14 may be parallel to the slow axis direction D1 of the first retardation plate 12.

As illustrated in FIG. 1, the third retardation plate 13 is arranged between the liquid crystal cell 20 and the second retardation plate 14. The retardation value R3 and the slow axis direction D3 of the third retardation plate 13 are set in accordance with the retardation value and the slow axis direction Lb of the liquid crystal layer 22 in black display period. In this example, the retardation value R3 and the slow axis direction D3 are set so as to compensate for the retardation caused by the liquid crystal layer 22 in black display period. That is, the third retardation plate 13 is capable of compensating for (cancelling) the retardation caused to the light emitted from the backlight unit 2 by the liquid crystal layer 22 in black display period. For example, the retardation value R3 of the third retardation plate 13 is set equal to the retardation value of the liquid crystal layer 22 in black display period. Further, the slow axis direction D3 of the third retardation plate 13 is set substantially perpendicular to the slow axis direction Lb of the liquid crystal layer 22 in black display period (see FIG. 2). As described above, in the example illustrated in FIG. 2, in black display period, the slow axis direction Lb of the liquid crystal layer 22 is perpendicular to the absorption axis direction A1 of the first polarizing plate 11, and is parallel to the absorption axis direction A2 of the second polarizing plate 15. Therefore, the slow axis direction D3 of the third retardation plate 13 is parallel to the absorption axis direction A1 of the first polarizing plate 11, and is perpendicular to the absorption axis direction A2 of the second polarizing plate 15.

Figure 5B:
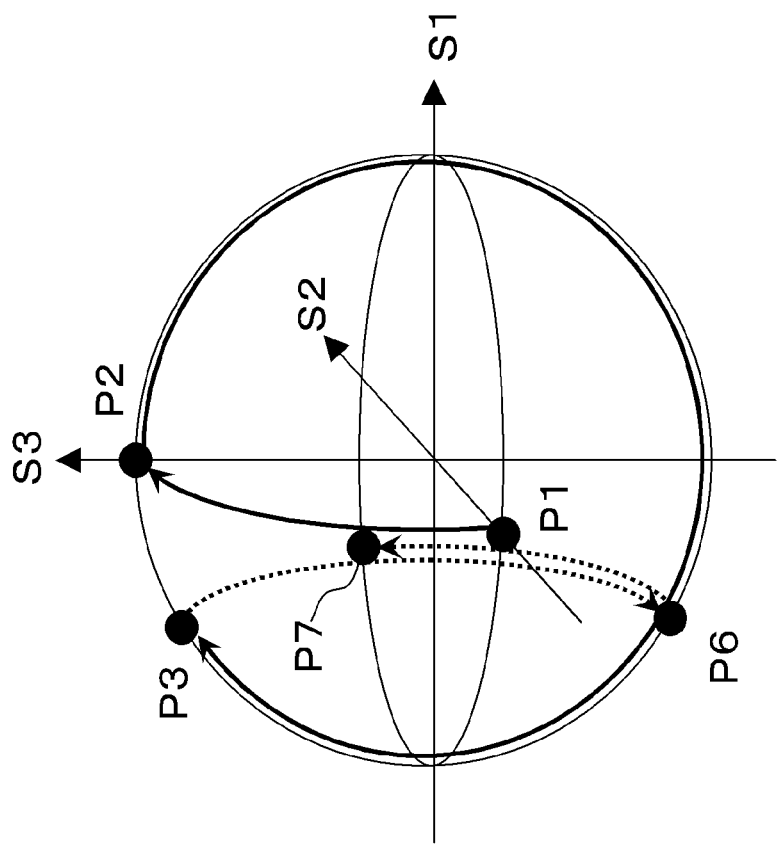
FIG. 5 is a diagram illustrating an example of the variation of polarization state in white display period.
Figure 5A:
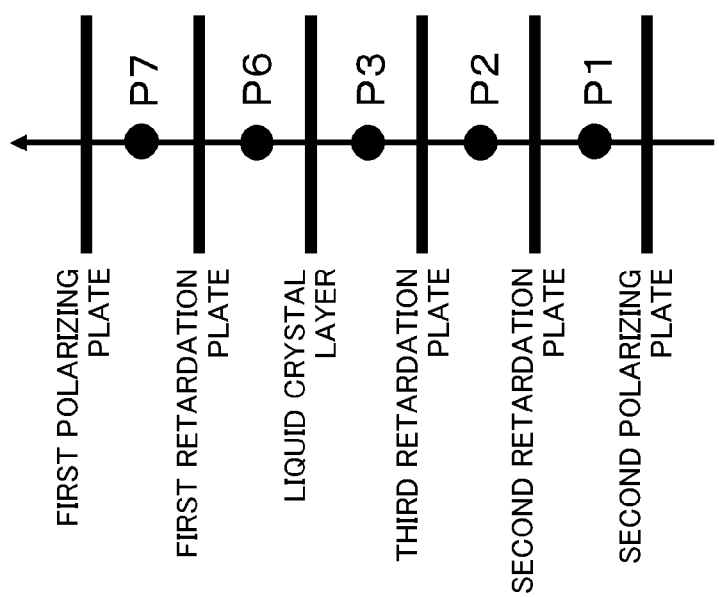

The variation of polarization state which occurs in the light entering the liquid crystal panel 10 from the back side thereof (that is, light emitted from the backlight unit 2) will be described by using a Poincare sphere. FIGS. 4A and 4B are diagrams illustrating an example of a variation of polarization state caused in black display period. FIG. 5 is a diagram illustrating an example of a variation of polarization state caused in white display period. In those diagrams, parts (b) illustrate the Poincare sphere, and parts (a) illustrate relations between polarization states represented by respective points on the Poincare sphere and positions in the liquid crystal panel 10. In the Poincare sphere illustrated in each diagram, values of S1, S2, and S3 represent Stokes parameters. Further, the light intensity is set to 1. That is, $S1^2+S2^2+S3^2=1$. The pole (S3=1) represents the clockwise circularly polarized light, and the pole (S3=−1) represents the counterclockwise circularly polarized light. Respective points on the equator (S3=0) represent the linearly polarized light. Further, in the following description, linearly polarized light P1 obtained by transmission through the second polarizing plate 15 is represented by the point of (S1, S2, S3)=(0, −1, 0).

First, description will be made of the example of the variation of polarization state caused in black display period. As described above, the slow axis direction D2 of the second retardation plate 14 is tilted by substantially 45 degrees with respect to the absorption axis direction A2 of the second polarizing plate 15, and the retardation value R2 thereof is a quarter wavelength. Therefore, as illustrated in FIG. 4A, the linearly polarized light P1 is rotationally transformed by π/2 (rad) about the S1 axis while passing through the second retardation plate 14 to thereby become circularly polarized light P2.

The slow axis direction D3 of the third retardation plate 13 is, as described above, substantially perpendicular to the absorption axis direction A2 of the second polarizing plate 15. Therefore, the circularly polarized light P2 is rotationally transformed about the S2 axis while passing through the third retardation plate 13, to thereby become elliptically polarized light P3. Further, the retardation value R3 of the third retardation plate 13 is, as described above, equal to the retardation value of the liquid crystal layer 22 in black display period. Further, the retardation value of the liquid crystal layer 22 in black display period is larger than a half wavelength. Therefore, the rotation angle of the rotational transform from the circularly polarized light P2 to the elliptically polarized light P3 is larger than π (rad).

As described above, the retardation value R3 and the slow axis direction D3 of the third retardation plate 13 are set so as to compensate for the retardation cause by the liquid crystal layer 22 in black display period. That is, the retardation value R3 is equal to the retardation value of the liquid crystal layer 22 in black display period, and the slow axis direction D3 and the slow axis direction Lb of the liquid crystal layer 22 in black display period are substantially perpendicular to each other. Therefore, as illustrated in FIG. 4B, the elliptically polarized light P3 passes through the liquid crystal layer 22 to be rotationally transformed about the S2 axis in a direction reverse to that at the time of transmission through the third retardation plate 13. Further, the rotation angle of this rotational transform is equal to the rotation angle of the rotational transform caused by the transmission through the third retardation plate 13. Therefore, the elliptically polarized light P3 becomes circularly polarized light P4 (P4=P2, in this example, clockwise circularly polarized light) by passing through the liquid crystal layer 22. In this example, the outside light received through the first polarizing plate 11 becomes counterclockwise circularly polarized light while passing through the first retardation plate 12 once. Accordingly, the linearly polarized light received through the second polarizing plate 15 becomes, in course of passing through three members of the second retardation plate 14, the third retardation plate 13, and the liquid crystal layer 22, circularly polarized light having a rotation direction reverse to that of the circularly polarized light formed when the outside light passes through the first retardation plate 12.

As described above, the first retardation plate 12 has a retardation value equal to that of the second retardation plate 14, and further, the slow axis directions D1 and D2 of those members are perpendicular to each other. Therefore, the circularly polarized light P4 passes through the first retardation plate 12 to rotate about the S1 axis by the same rotation angle and in a direction reverse to that at the time of transmission through the second retardation plate 14, to thereby become linearly polarized light P5 (P5=P1). The first polarizing plate 11 and the second polarizing plate 15 are arranged in the crossed Nicols arrangement, so that the linearly polarized light P5 is absorbed in the first polarizing plate 11. As a result, good black display can be obtained.

Next, a variation of polarization state caused in white display period will be described. As illustrated in FIG. 5, light entering the liquid crystal panel 10 from the backside thereof is subjected to the same polarization transformation as that in black display period until the light passes through the third retardation plate 13 to become the elliptically polarized light P3.

As described above, the slow axis direction Lw of the liquid crystal layer 22 in white display period is tilted by substantially 45 degrees with respect to the slow axis direction Lb set in black display period. That is, in white display period, the slow axis direction of the liquid crystal layer 22 is tilted by substantially 45 degrees with respect to the absorption axis direction A2 of the second polarizing plate 15. Further, as described above, in white display period, the liquid crystal layer 22 has a retardation value of a half wavelength. Therefore, the elliptically polarized light P3 passes through the liquid crystal layer 22 to be rotationally transformed about the S1 axis by π (rad), to thereby become elliptically polarized light P6.

The elliptically polarized light P6 passes through the first retardation plate 12 to be rotationally transformed about the S1 axis by π/2 (rad), to thereby become linearly polarized light P7. As described above, the slow axis direction D1 of the first retardation plate 12 and the slow axis direction D2 of the second retardation plate 14 are perpendicular to each other. Therefore, the elliptically polarized light P6 passes through the first retardation plate 12 to be rotationally transformed in a direction reverse to that of the rotational transform caused by the transmission through the second retardation plate 14. The oscillating direction of the linearly polarized light P7 is close to a direction perpendicular to the absorption axis direction A1 of the first polarizing plate 11, and hence good white display can be obtained.

As is understood from FIG. 5, when the difference between the retardation value of the liquid crystal layer 22 in black display period (retardation value R3 of the third retardation plate 13) and the retardation value (half wavelength) of the liquid crystal layer 22 in white display period is equal to or larger than a quarter wavelength and equal to or smaller than a half wavelength, the value of S3 in the polarization state of P3 is equal to or larger than 0. As a result, an angle between the oscillating direction of the linearly polarized light P7 and the absorption axis direction A1 of the first polarizing plate 11 becomes larger than 45 degrees, and hence sufficient white display can be obtained. In particular, when the retardation value of the liquid crystal layer 22 in black display period (retardation value R3 of the third retardation plate 13) is one wavelength, and the retardation value of the liquid crystal layer 22 in white display period is a half wavelength, P3 becomes clockwise circularly polarized light. As a result, the oscillating direction of the linearly polarized light P7 becomes perpendicular to the absorption axis direction Al of the first polarizing plate 11, and hence the best white display can be obtained. For example, when referring to green light (wavelength=550 nm), the best white display can be obtained by a difference of 275 nm between retardation value of the liquid crystal layer 22 in black display period and the retardation value of the liquid crystal layer 22 in white display period. Further, also from the viewpoint of suppressing reflection light from the transparent substrate 25 in black display period, the retardation value of the liquid crystal layer 22 in black display period is desired to be close to one wavelength.

Such a large difference between the retardation value of the liquid crystal layer 22 in black display period and the retardation value of the liquid crystal layer 22 in white display period can be obtained by, for example, the following method. Specifically, a material of the liquid crystal molecules having high anisotropy of dielectric constant can strengthen the tendency of tilting, in white display period, the liquid crystal molecules in the direction in which the transparent substrates 21 and 25 face each other. As a result, the difference between the two retardation values can be increased.

Further, the thickness of the liquid crystal layer 22 is set so that the retardation value of the liquid crystal layer 22 in black display period becomes close to one wavelength. In addition, a voltage is applied to the pixel electrode 25a in white display period so that the retardation value of the liquid crystal layer 22 set in white display period becomes close to a half wavelength. Also with this method, the difference between the two retardation values can be set close to a half wavelength.

Further, the width and/or the interval of the pixel electrode 25a is increased, and thereby the number of the edges of the electrode which generates the fringe electric field is reduced. That is, the width and/or the interval of the part corresponding to respective teeth of the pixel electrode 25a formed into a comb shape is increased, and the number of the edge of the part corresponding to the teeth (part which generates the fringe electric field) in one pixel is reduced. With this method, it is possible to actively cause the liquid crystal molecules M to rise, and the difference between the two retardation values can be brought close to a half wavelength. By setting the width and the interval of the part corresponding to the teeth of the pixel electrode 25a to be two times the thickness of the liquid crystal layer 22 or larger, particularly good effects can be obtained.

Figure 6:
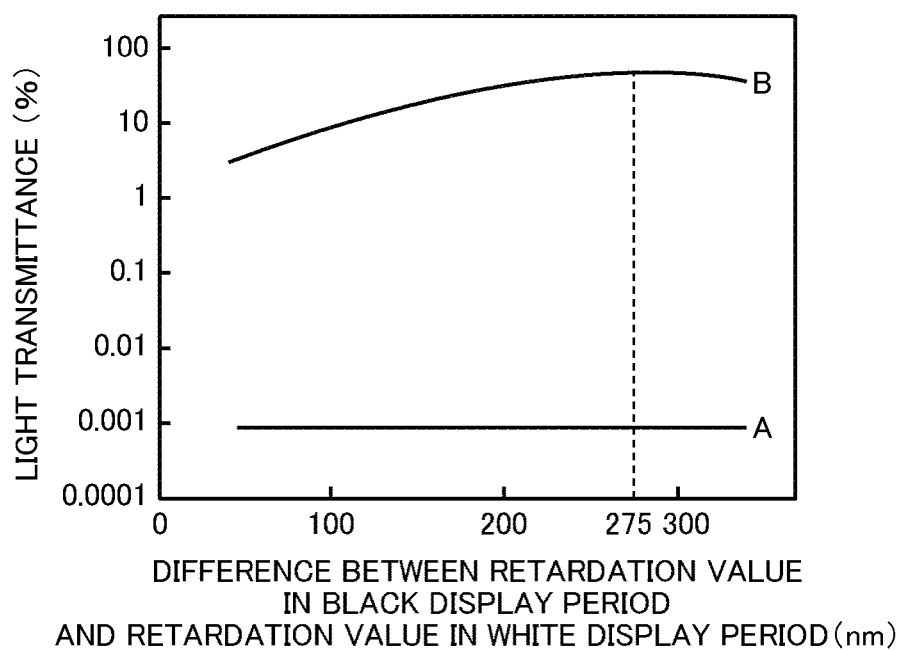
FIG. 6 is a graph illustrating an example of a relation between a light transmittance of the liquid crystal panel, and a difference between a retardation value of the liquid crystal layer in black display period and a retardation value of the liquid crystal layer in white display period.

FIG. 6 is a graph illustrating an example of a relation between a light transmittance of the liquid crystal panel 10, and a difference between the retardation value of the liquid crystal layer 22 in black display period and the retardation value of the liquid crystal layer 22 in white display period. In FIG. 6, the horizontal axis indicates the difference (α) between the retardation value (half wavelength) of the liquid crystal layer 22 in white display period and the retardation value (half wavelength+α) of the liquid crystal layer 22 in black display period, and the vertical axis indicates the light transmittance.

As described above, the retardation value R3 and the slow axis direction D3 of the third retardation plate 13 are set so as to compensate for the retardation caused by the liquid crystal layer 22 in black display period. Further, the retardation value R2 and the slow axis direction D2 of the second retardation plate 14 are set so as to compensate for the retardation caused by the first retardation plate 12. Therefore, as represented by the line A of FIG. 6, the light transmittance in black display period is low regardless of the difference (α). The light transmittance in white display period becomes, as represented by the line B of FIG. 6, gradually higher as the difference (α) becomes larger. Then, the light transmittance in white display period takes the maximum value when the difference (α) is 275 nm described above. This maximum value is similar to that of a general IPS mode. Note that, when the difference (α) is equal to or larger than 100 nm and equal to or smaller than 300 nm, sufficient white display can be obtained.

Figure 7:
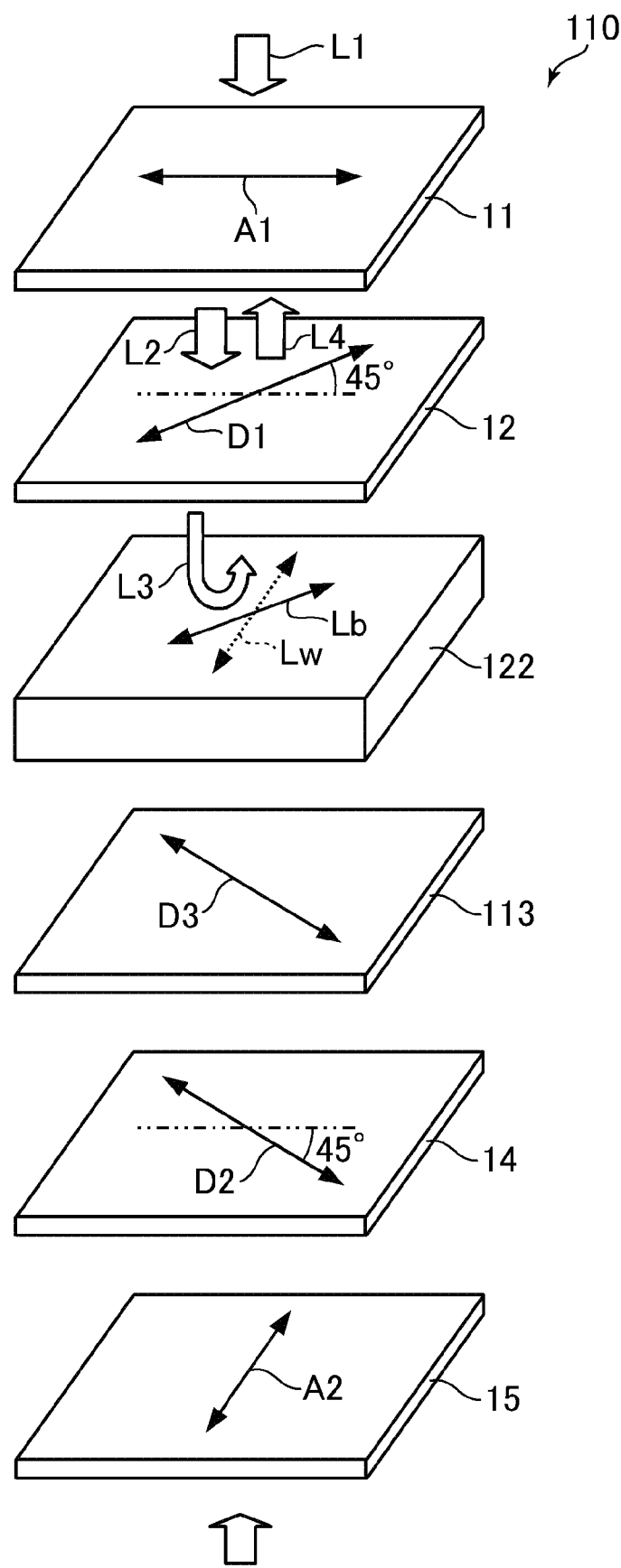
FIG. 7 is a view illustrating a slow axis direction and an absorption axis direction of optical members forming a liquid crystal panel of another example of the embodiment.

Another example of this embodiment will be described. FIG. 7 is a view illustrating a slow axis direction or an absorption axis direction of optical members forming a liquid crystal panel 110 according to the another example. In FIG. 7, the same portions as those described above are represented by the same reference symbols. In the following, description of the same matters as those in the above-mentioned liquid crystal panel 10 will be omitted, and only the different points will be described.

As illustrated in FIG. 7, the liquid crystal panel 110 includes a liquid crystal layer 122. A slow axis direction Lb of the liquid crystal layer 122 in black display period differs from that of the above-mentioned liquid crystal layer 22, and is tilted with respect to both of the absorption axis direction A1 of the first polarizing plate 11 and the absorption axis direction A2 of the second polarizing plate 15. Specifically, the slow axis direction Lb of the liquid crystal layer 122 in black display period is tilted by substantially 45 degrees with respect to the absorption axis directions A1 and A2. Further, the slow axis direction Lb of the liquid crystal layer 122 in black display period is substantially parallel to the slow axis direction D1 of the first retardation plate 12, and is perpendicular to the slow axis direction D2 of the second retardation plate 14.

Meanwhile, a slow axis direction Lw of the liquid crystal layer 122 in white display period is perpendicular to the absorption axis direction A1 of the first polarizing plate 11, and is parallel to the absorption axis direction A2 of the second polarizing plate 15. Note that, directions of the slow axis direction Lw set in white display period and the slow axis direction Lb set in black display period are not limited thereto. For example, the direction of the slow axis direction Lw set in white display period may be parallel to the absorption axis direction A1 of the first polarizing plate 11, and may be perpendicular to the absorption axis direction A2 of the second polarizing plate 15. A retardation value of the liquid crystal layer 122 in white display period and a retardation value of the liquid crystal layer 122 in black display period are the same as those in the above-mentioned liquid crystal layer 22.

The liquid crystal panel 110 includes a third retardation plate 113. The third retardation plate 113 has, similarly to the third retardation plate 13, a retardation value R3 and a slow axis direction D3, which are set in accordance with the retardation value and the slow axis direction Lb of the liquid crystal layer 122 in black display period. Specifically, the retardation value R3 and the slow axis direction D3 of the third retardation plate 113 are set so as to compensate for the retardation caused by the liquid crystal layer 122 in black display period. That is, the retardation value of the third retardation plate 113 is set equal to the retardation value of the liquid crystal layer 122 in black display period, and the slow axis direction D3 is set substantially perpendicular to the slow axis direction Lb of the liquid crystal layer 122 in black display period.

Figure 8A:
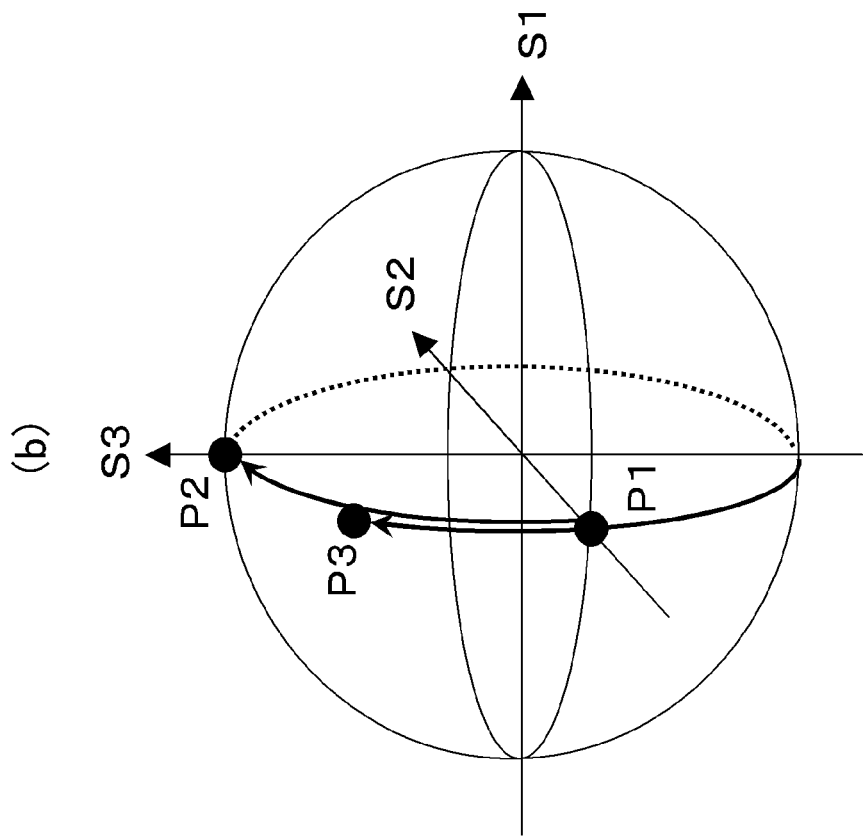
FIG. 8A is a diagram illustrating an example of a polarization state variation in a case where the liquid crystal panel in the example illustrated in FIG. 7 displays black.
Figure 9B:
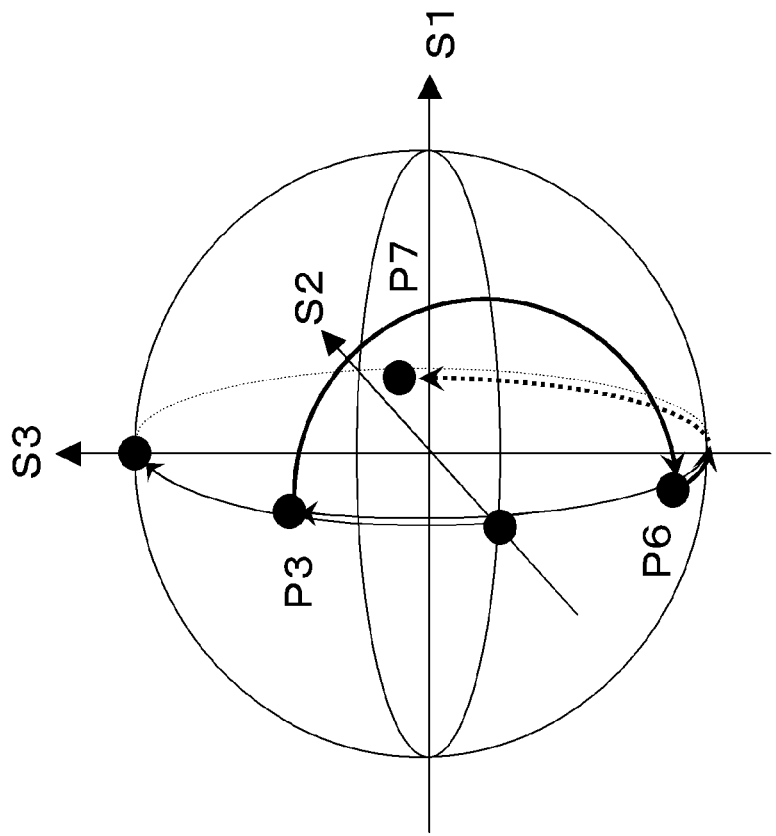
FIG. 9 is a diagram illustrating an example of the variation of polarization state in a case where the liquid crystal panel in the example illustrated in FIG. 7 displays white.
Figure 9A:
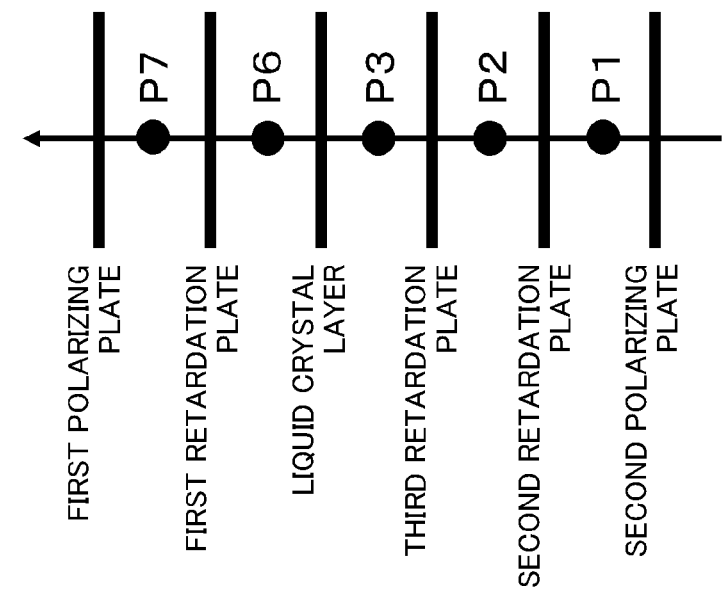

The variation of polarization state which occurs in the light entering the liquid crystal panel 110 from the back side thereof (that is, light emitted from the backlight unit 2) will be described by using a Poincare sphere. FIGS. 8A and 8B are diagrams illustrating an example of the variation of polarization state in black display period. FIG. 9 is a diagram illustrating an example of the variation of polarization state in white display period. Also in those diagrams, parts (b) illustrate the Poincare sphere, and parts (a) illustrate relations of polarization states represented by respective points on the Poincare sphere and the positions in the liquid crystal panel 110.

First, the variation of polarization state which occurs in black display period will be described. As described with reference to FIG. 4A, linearly polarized light P1 obtained by transmission through the second polarizing plate 15 passes through the second retardation plate 14 to be rotationally transformed about the S1 axis by $\pi/2$ (rad), to thereby become circularly polarized light P2.

The slow axis direction D3 of the third retardation plate 113 is, as described above, tilted by substantially 45 degrees with respect to the absorption axis direction A2 of the second polarizing plate 15. Therefore, as illustrated in FIG. 8A, the circularly polarized light P2 passes through the third retardation plate 113 to be rotationally transformed about the S1 axis, to thereby become elliptically polarized light P3. Further, the retardation value R3 of the third retardation plate 113 corresponds to the retardation value of the liquid crystal layer 122 in black display period, and the retardation value of the liquid crystal layer 122 in black display period is larger than a half wavelength. Therefore, the rotation angle of the rotational transform from the circularly polarized light P2 to the elliptically polarized light P3 is larger than $\pi$ (rad).

As described above, the slow axis direction D3 of the third retardation plate 113 and the slow axis direction Lb of the liquid crystal layer 122 in black display period are substantially perpendicular to each other. Therefore, as illustrated in FIG. 8B, the elliptically polarized light P3 passes through the liquid crystal layer 122 to rotationally transformed about the S1 axis in a direction reverse to that of the rotational transform caused by the transmission through the third retardation plate 113. Further, the retardation value R3 of the third retardation plate 113 is equal to the retardation value of the liquid crystal layer 122 in black display period. Therefore, the rotation angle of this rotational transform is equal to that of the rotational transform caused by the transmission through the third retardation plate 113. As a result, the elliptically polarized light P3 passes through the liquid crystal layer 122 to become circularly polarized light P4 (P4=P2).

As described above, the first retardation plate 12 has a retardation value equal to that of the second retardation plate 14, and further, the slow axis directions D1 and D2 of those members are perpendicular to each other. Therefore, the circularly polarized light P4 passes through the first retardation plate 12 to rotate about the S1 axis by the same rotation angle and in a direction reverse to that of the rotational transform caused by the transmission through the second retardation plate 14, to thereby become linearly polarized light P5 (P5=P1). The first polarizing plate 11 and the second polarizing plate 15 are arranged in the crossed Nicols arrangement, and hence the linearly polarized light P5 is absorbed in the first polarizing plate 11. As a result, good black display is obtained.

Next, a variation of polarization state which occurs in white display period will be described. As illustrated in FIG. 9, light entering the liquid crystal panel 10 from the back side thereof is subjected to the same polarization transformation as that in black display period until the light passes through the third retardation plate 113 to become the elliptically polarized light P3.

As described above, the slow axis direction Lw of the liquid crystal layer 122 in white display period is parallel to the absorption axis direction A2 of the second polarizing plate 15. Further, in white display period, the liquid crystal layer 122 has a retardation value of a half wavelength. Therefore, the elliptically polarized light P3 passes through the liquid crystal layer 122 to be rotationally transformed about the S2 axis by $\pi$ (rad), to thereby become elliptically polarized light P6.

The elliptically polarized light P6 passes through the first retardation plate 12 to be rotationally transformed about the S1 axis by $\pi/2$ (rad), to thereby become linearly polarized light P7. As described above, the slow axis direction of the first retardation plate 12 and the slow axis direction of the second retardation plate 14 are perpendicular to each other. Therefore, the elliptically polarized light P6 passes through the first retardation plate 12 to be rotationally transformed in a direction reverse to that of the rotational transform caused by the transmission through the second retardation plate 14, to thereby become the elliptically polarized light P7. The rotational transform from the circularly polarized light P2 to the elliptically polarized light P3, and the rotational transform from the elliptically polarized light P6 to the elliptically polarized light P7 are performed about the S1 axis, and the rotational transform from the elliptically polarized light P3 to the elliptically polarized light P6 is performed about the S2 axis by $\pi/2$ (rad). Therefore, a long axis direction of the elliptically polarized light P7 is perpendicular to the absorption axis direction A1 of the first polarizing plate 11. As a result, a part of the elliptically polarized light P7 passes through the first polarizing plate 11, and thus good white display can be obtained.

As is understood from FIG. 9, when the difference between the retardation value of the liquid crystal layer 122 in black display period (retardation value R3 of the third retardation plate 113) and the retardation value (half wavelength) of the liquid crystal layer 122 in white display period is equal to or larger than a quarter wavelength and equal to or smaller than a half wavelength, the value of S3 in the polarization state of P3 is equal to or larger than 0. As a result, the polarized light indicated by P7 becomes circularly polarized light (in this example, counterclockwise circularly polarized light), or elliptically polarized light having the long axis direction perpendicular to the absorption axis direction A1 of the first polarizing plate 11. Therefore, sufficient white display can be obtained. In particular, when the retardation value of the liquid crystal layer 122 in black display period (retardation value R3 of the third retardation plate 113) is one wavelength, and the retardation value of the liquid crystal layer 122 in white display period is a half wavelength, P3 becomes circularly polarized light (in the example of FIG. 9, clockwise circularly polarized light). As a result, the oscillating direction of the linearly polarized light P7 is perpendicular to the absorption axis direction A1 of the first polarizing plate 11, and thus the best white display can be obtained.

As described above, the first retardation plate 12 is arranged between the liquid crystal layer 22 and the first polarizing plate 11. The first retardation plate 12 cause a retardation to light passing through the first retardation plate 12 so that light received from the front side thereof through the first polarizing plate 11 becomes close to circularly polarized light. Therefore, even when the liquid crystal display device 1 is used outdoors, the reflection of outside light by the liquid crystal panel 10 can be suppressed. Further, the retardation values R2 and R3 and the slow axis directions D2 and D3 of the second retardation plate 14 and the third retardation plate 13 or 113, respectively, are set so that light received through the second polarizing plate 15 from the back side of the liquid crystal panel 10 or 110 passes through both of the retardation plates 14 and 13 or 113 and the liquid crystal layer 22 or 122 in black display period to become close to circularly polarized light (circularly polarized light rotating in a direction reverse to that of the circularly polarized light received through the first retardation plate 12 from the front side of the liquid crystal panel 10 or 110). Therefore, good black display can be obtained. Further, the liquid crystal layer 22 or 122 has retardation values different between in black display period and in white display period. Therefore, sufficient white display can be obtained.

Note that, the present invention is not limited to the liquid crystal panels 10 and 110 described above, and various modifications are possible. For example, the retardation plates 12, 13, 14, and 113 may be a film or a layer applied on a member forming liquid crystal panels 10 and 110. Further, as long as the optical structures illustrated in FIGS. 2 and 7 are satisfied, the retardation plates 12, 13, 14, and 113 may be arranged toward the liquid crystal layer 22 on the transparent substrate 21 and on the transparent substrate 25.

Further, in the description above, a quarter wavelength plate is exemplified as the first retardation plate 12 and the second retardation plate 14, but the retardation value of those retardation plates may be slightly shifted from a quarter wavelength.

Further, other optical members such as a view expansion film may be provided to the liquid crystal panels 10 and 110.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal panel to receive light applied on a back side thereof from a backlight unit in use, comprising:
    a first polarizing plate arranged on a front side of the liquid crystal panel;
    a second polarizing plate arranged on the back side of the liquid crystal panel;
    a liquid crystal cell having a liquid crystal layer containing liquid crystal molecules to be driven in in-plane switching mode, the liquid crystal cell being arranged between the first polarizing plate and the second polarizing plate;
    a first retardation plate arranged between the liquid crystal layer and the first polarizing plate, the first retardation plate causing a retardation in light received through the first polarizing plate from the front side of the liquid crystal panel so that the received light becomes close to circularly polarized light rotating in a first direction from linearly polarized light; and
    at least one retardation plate arranged between the liquid crystal layer and the second polarizing plate,
    wherein the liquid crystal layer has different retardation values between a black display period and a white display period,
    wherein the at least one retardation plate has a retardation value and a slow axis direction so that light received through the second polarizing plate from the back side of the liquid crystal panel becomes close to circularly polarized light rotating in a second direction opposite to the first direction from linearly polarized light while passing through both of the at least one retardation plate and the liquid crystal layer during the black display period,
    wherein the at least one retardation plate cancels the retardation caused in light emitted from the backlight unit by the liquid crystal layer during the black display period,
    wherein the first retardation plate employs a quarter wavelength plate having a slow axis direction which is tilted by substantially 45 degrees with respect to an absorption axis direction of the first polarizing plate; and
    wherein the second retardation plate employs a quarter wavelength plate having a slow axis direction substantially perpendicular to the slow axis direction of the first retardation plate.

2. The liquid crystal panel according to claim 1, wherein the at least one retardation plate comprises:
    a second retardation plate, which has a retardation value and a slow axis direction corresponding to a retardation value and a slow axis direction of the first retardation plate; and
    a third retardation plate, which is arranged between the liquid crystal layer and the second retardation plate.

3. The liquid crystal panel according to claim 2, wherein:
    the retardation value and the slow axis direction of the second retardation plate are set so that a retardation caused by the first retardation plate is compensated; and
    a retardation value and a slow axis direction of the third retardation plate are set so that the retardation caused by the liquid crystal layer in the black display period is compensated.

4. The liquid crystal panel according to claim 2, wherein the slow axis direction of the third retardation plate is substantially perpendicular to the slow axis direction of the liquid crystal layer set in the black display period.

5. The liquid crystal panel according to claim 1, wherein the first retardation plate employs a quarter wavelength plate having a slow axis direction tilted by substantially 45 degrees with respect to an absorption axis direction of the first polarizing plate.

6. The liquid crystal panel according to claim 1, wherein:
    the retardation value of the liquid crystal layer in the black display period is larger than the retardation value of the liquid crystal layer in the white display period; and
    a difference between the retardation value of the liquid crystal layer in the black display period and the retardation value of the liquid crystal layer in the white display period is equal to or larger than 100 nm and equal to or smaller than 300 nm.

7. The liquid crystal panel according to claim 1, wherein:
    the retardation value of the liquid crystal layer in the black display period is larger than the retardation value of the liquid crystal layer in the white display period and
    a difference between the retardation value of the liquid crystal layer in the black display period and the retardation value of the liquid crystal layer in the white display period is equal to or larger than a quarter wavelength and equal to or smaller than a half wavelength.

8. A liquid crystal display device, comprising the liquid crystal panel according to claim 1.

9. A liquid crystal panel to receive light applied on a back side thereof from a backlight unit in use, comprising:
    a first polarizing plate arranged on a front side of the liquid crystal panel;
    a second polarizing plate arranged on the back side of the liquid crystal panel;
    a liquid crystal cell having a liquid crystal layer containing liquid crystal molecules to be driven in in-plane switching mode, the liquid crystal cell being arranged between the first polarizing plate and the second polarizing plate;
    a first retardation plate arranged between the liquid crystal layer and the first polarizing plate, the first retardation plate causing a retardation in light received through the first polarizing plate from the front side of the liquid crystal panel so that the received light becomes close to circularly polarized light rotating in a first direction from linearly polarized light; and
    a second retardation plate arranged between the liquid crystal layer and the second polarizing plate,
    a third retardation plate arranged between the second retardation plate and the liquid crystal layer having a retardation value and a slow axis direction that directly cancels the retardation value and a slow axis direction of the liquid crystal layer during a black display period, wherein the liquid crystal layer has different retardation values during the black display period and a white display period, wherein the second retardation plate has a retardation value and a slow axis direction so that light received through the second polarizing plate from the back side of the liquid crystal panel becomes close to circularly polarized light rotating in a second direction opposite the first direction from linearly polarized light while passing through both of the second retardation plate and the liquid crystal layer during the black display period, wherein the first retardation plate employs a quarter wavelength plate having a slow axis direction which is tilted by substantially 45 degrees with respect to an absorption axis direction of the first polarizing plate, and wherein the second retardation plate employs a quarter wavelength plate having a slow axis direction substantially perpendicular to the slow axis direction of the first retardation plate.

10. The liquid crystal panel according to claim 9, wherein the retardation value of the third retardation plate is greater than half of a wavelength.

11. The liquid crystal panel according to claim 10, wherein the liquid crystal layer has a retardation value greater than half of a wavelength and less than a full wavelength when in a black display mode.

12. The liquid crystal panel according to claim 10, wherein the second retardation plate is ¼wavelength.

* * * * *